July 14, 1942.    M. MOKIN    2,290,115
FILM SPLICER
Filed May 13, 1941    2 Sheets-Sheet 1

INVENTOR.
Max Mokin
BY
ATTORNEY.

July 14, 1942. M. MOKIN 2,290,115
FILM SPLICER
Filed May 13, 1941 2 Sheets-Sheet 2
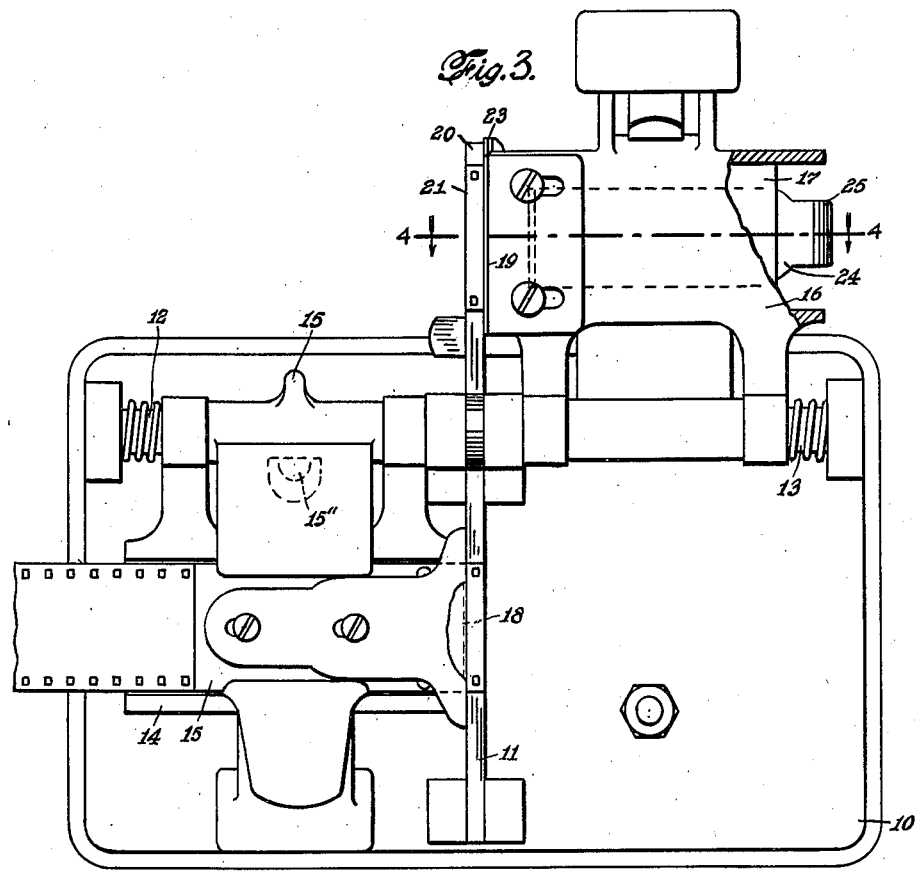
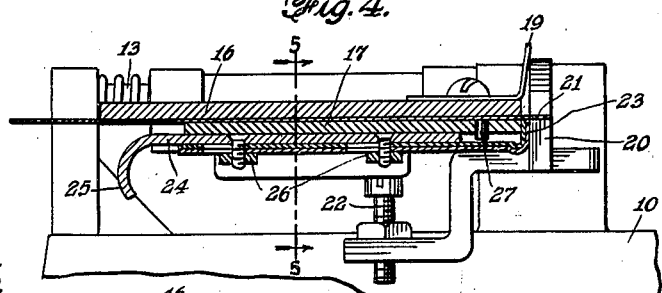
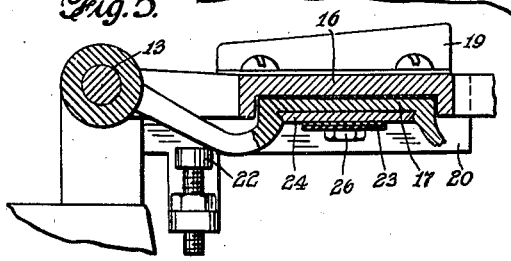
INVENTOR.
MAX MOKIN
BY
ATTORNEY.

Patented July 14, 1942

2,290,115

UNITED STATES PATENT OFFICE 2,290,115

FILM SPLICER

Max Mokin, Brooklyn, N. Y.

Application May 13, 1941, Serial No. 393,164

4 Claims. (Cl. 154—42)

The invention relates to film splicers for trimming the ends of adjacent film sections and then uniting the trimmed ends after first scraping the emulsion from the surface of one of the film ends and scraping and/or roughening the under and coacting surface of the other film end.

Apparatus of this general type is disclosed in U. S. Letters Patent #1,596,966 to Griswold wherein a double shear block is provided which cooperates with a pair of upwardly swingable film clamps located upon opposite sides of the shear block. The lower jaw of each clamp is provided with a cutting blade and the two blades are arranged to coact alternatively with the block in trimming the film sections. In apparatus of this type, however, the upward swing of a film clamp is limited to approximately 90° and it is not feasible, therefore, to scrape conveniently more than one of the film ends, as this would necessitate removal from its clamp of the film with scraped end, and its replacement by the film from the other clamp whose end is to be united thereto, and then replacement of both film sections in the original positions which they occupied in their respective clamps for the trimming of the film.

The present invention has for an object to facilitate the scraping of both film ends, which is accomplished without necessitating any removal of the film sections from the clamps after they have once been located therein for the trimming operation.

This is effected by extending the shear block rearwardly and permitting one of the film clamps to swing backwardly through an arc, for example, of substantially 180° whereby to expose the under surface of the trimmed film end and to juxtapose the same over the rearwardly directed portion of the shear block. This surface may then be scraped and/or roughened in the usual manner against said extension of the shear block as an abutment or anvil. The particular clamp having this additional swing is the one which also carries the presser blade for eventually exerting pressure upon the superposed trimmed ends when these are positioned over the original shear block portion, and the said blade is made longitudinally movable of the clamp for retraction temporarily in order to clear the extended portion of the shear block when the clamp is thrown backwardly through the arc of 180°. This permits the projecting trimmed film end held by the clamp to rest upon the shear block flush with its top surface. A stop member is provided to limit the extent of swing of the clamp and is adjustable to secure the desired alignment of film end and surface of rearwardly directed portion of the shear block.

The nature of the invention, however, will best be understood when described in connection with the accompanying drawings, in which:

Fig. 3 is a plan view similar to Fig. 1 with the one clamp thrown upwardly through an arc of approximately 180°, and with a portion of the underside of the film clamp broken away.

Fig. 4 is a transverse section, on an enlarged scale, taken on the line 4—4, Fig. 3 of the drawings, and looking in the direction of the arrows.

Fig. 5 is a fragmentary vertical section taken on the line 5—5, Fig. 4 of the drawings, and looking in the direction of the arrows.

Figure 1:
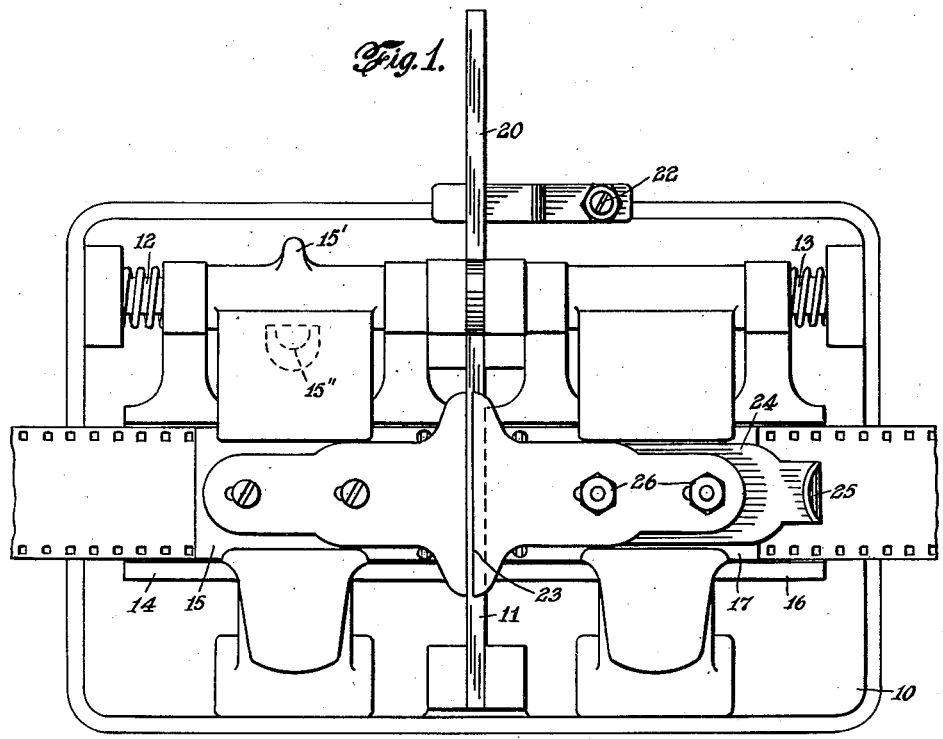
Fig. 1 is a plan view of the splicer machine equipped with the novel scraping facilities.
Figure 2:
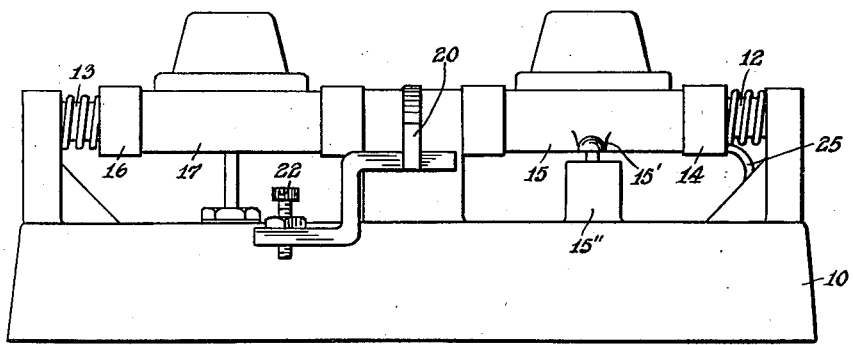
Fig. 2 is a rear view of the same.

Referring to the drawings, the film splicer comprises a base or supporting frame 10 on the top of which, and substantially midway thereof, is mounted a double shear block 11. On either side of this block are mounted two swingable film clamps as on fixed spindles 12 and 13, respectively, said clamps comprising respectively a lower jaw 14 and an upper jaw 15, and a lower jaw 16 and an upper jaw 17 for clamping therebetween film ends to be united, as is well understood. The swing of clamp 14—15 is limited to an arc of substantially 90° by contact of a lug 15' of the jaw 15 with a stop 15'' extending upwardly from frame 10.

These film ends are adapted to be trimmed on the shear block 11 in the usual manner by means of respective blades 18 and 19 carried by the lower jaw members of the two clamps, as in swinging one clamp with its blade over the projecting film end held by the other clamp.

In accordance with the invention, the shear block 11 is extended rearwardly to afford a section 20 as an abutment or anvil whereon the underside, for example, of a trimmed film end 21 may be scraped and/or roughened while held in its clamp, the other film end being scraped in the usual manner while held in its clamp by the forward portion of the shear block. In order to provide for access to the underside of the film held between the jaws 16 and 17, this film clamp is arranged to swing backwardly for juxtaposition of the film end to the portion 20 of the shear block. The extent of swing of this clamp, which is preferably through an arc of 180°, is limited by an adjustable stop 22 designed to engage the outer surface of clamp half or jaw 17 to hold the film end into the plane of the said surface portion 20.

In order to permit this, the said clamp which usually carries the presser blade 23 designed for subsequent pressing together of the trimmed edges when cemented, is modified. For example, said blade 23 is arranged to be longitudinally slidable over the upper jaw member 17 of the clamp to allow the blade to be retracted temporarily to clear the rearward extension 20 of the shear block when the clamp is turned over to expose the under face of a film end, as indicated in Figs. 3 and 4 of the drawings. As shown, the presser blade 23 is mounted on a slide 24 fitted to the channeled outer surface of the upper jaw member 17 and terminating at the outer end in a finger piece 25 for manipulating the slide. To the top of the latter the said presser blade is secured for longitudinal adjustment by means of the pair of nuts 26 fitting screws extending from the said slide, the said blade being slotted to pass the screws and permit of the adjustment of the latter relatively to the former. The movement of the slide with respect to jaw 17 is limited in the direction toward the shear block by means of contact with a pin 27 projecting into its path of travel from the block end of the upper jaw, while its retraction is limited by contact of the presser finger portion of the blade with the jaw itself, as indicated in Fig. 4.

I claim:

1. In a film splicer of the double shear block type including a pair of upwardly swingable film clamps with cutting blades arranged to coact alternatively with said shear block for trimming film sections to provide overlapping ends adapted for juxtaposition over the said block: a rearward extension of said shear block in the vertical plane thereof, and means to limit the swing of one of said clamps to position the projecting end of the film section held by said clamp upon said rearward extension of the shear block and expose the undersurface of the said projecting end for scraping the same on said extension as an anvil.

2. The film splicer of claim 1, wherein the swing of the positioning clamp is limited to an arc of substantially 180° and the swing of the other clamp to an arc of substantially 90°.

3. In a film splicer of the double shear block type including a pair of upwardly swingable film clamps with cutting blades arranged to coact alternatively with said shear block for trimming film sections to provide overlapping ends adapted for juxtaposition over the said block and a presser member for holding juxtaposed film ends on the shear block: a rearward extension of said shear block in the vertical plane thereof, means to limit the swing of one of said clamps to position the projecting end of the film section held by said clamp upon said rearward extension of the shear block and expose the undersurface of the said projecting end for scraping the same on said extension as an anvil, and means for clearing the presser member with respect to the rearward extension when the said one clamp is to be swung to position the end of the film section held thereby upon the said rearward extension of the shear block for scraping of the exposed surface of the film end thereon as an anvil.

4. The film splicer of claim 3 wherein the positioning clamp carries at its top a retractable presser blade, together with means for mounting the same slidably thereon to be retracted temporarily sufficiently to clear the rearward extension when said clamp is swung to position the end of the film section held by said clamp upon said extension for scraping of the exposed surface of the film end thereon as an anvil.

MAX MOKIN.